United States Patent
Yee

(10) Patent No.: US 8,947,473 B2
(45) Date of Patent: Feb. 3, 2015

(54) MICRO-SHUTTER DISPLAY DEVICE

(75) Inventor: Youngjoo Yee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 269 days.

(21) Appl. No.: 13/521,203

(22) PCT Filed: Oct. 12, 2011

(86) PCT No.: PCT/KR2011/007567
§ 371 (c)(1),
(2), (4) Date: Jul. 9, 2012

(87) PCT Pub. No.: WO2012/165721
PCT Pub. Date: Dec. 6, 2012

(65) Prior Publication Data
US 2013/0088469 A1    Apr. 11, 2013

(30) Foreign Application Priority Data

May 31, 2011    (KR) .................. 10-2011-0052424

(51) Int. Cl.
G09G 5/10    (2006.01)
G02B 26/00    (2006.01)
G09G 5/00    (2006.01)

(52) U.S. Cl.
CPC ... *G09G 5/00* (2013.01); *G09G 5/10* (2013.01)
USPC ........ 345/690; 345/204; 345/102; 359/224.2; 359/291

(58) Field of Classification Search
CPC ............... G02B 26/0841; G02B 26/02; G02B 21/0072; G02B 26/0858; G02B 27/017; G02B 27/0172; G02B 17/0816; G02B 26/004; G02B 26/0833; G02B 6/0053; G02B 6/0061; G02B 26/005; G02B 6/0036; G02B 6/0038; G02B 26/00; G02B 26/001; G02B 26/06; G02B 26/0866; G02B 5/045; G09G 3/3433; G09G 3/2022; G09G 2310/0235; G09G 2300/08; G09G 3/2081; G09G 3/3406; G09G 2300/0809; G09G 2360/144; G09G 3/3413; G09G 2300/0842; G09G 2320/0633; G09G 2330/021; G09G 3/2003
USPC ................. 345/690, 204, 169, 173, 108, 109, 345/78–102
See application file for complete search history.

(56) References Cited

U.S. PATENT DOCUMENTS 6,437,769 B1    8/2002 Kobayashi et al.
6,842,170 B1    1/2005 Akins et al.
(Continued)

FOREIGN PATENT DOCUMENTS

KR    2000-0062904 A    10/2000
KR    2001-0030690 A    4/2001
KR    2008-0066750 A    7/2008

*Primary Examiner* — Duc Dinh
(74) *Attorney, Agent, or Firm* — Birch, Stewart, Kolasch & Birch, LLP

(57) ABSTRACT

Disclosed is a display device and, more particularly, a micro-shutter display device including: a light source emitting light; a lower substrate having an optical conversion unit performing at least any one of a function of converting back light output from a light source into primary colors corresponding to sub-pixels and a function of reflecting ambient light having a primary color band corresponding to sub-pixels; a micro-shutter opening and closing a path of light output from the optical conversion unit; and a driving circuit supplying a driving signal to a movable unit electrode or a fixed counter electrode, wherein the micro-shutter includes: a shutter micro-structure comprised of a shutter blade blocking light output from the optical conversion unit and a shutter aperture allowing light output from the optical conversion unit to be transmitted therethrough; an elastic element connected to the shutter micro-structure to provide elastic restoring force when the shutter micro-structure structure is driven; a movable unit electrode configured to be connected to the shutter micro-structure; and a fixed counter electrode spaced apart by a certain interval from the movable unit electrode.

17 Claims, 11 Drawing Sheets

(56) References Cited

U.S. PATENT DOCUMENTS

| | | | |
|---|---|---|---|
| 7,417,782 B2* | 8/2008 | Hagood et al. | 359/290 |
| 7,852,546 B2* | 12/2010 | Fijol et al. | 359/291 |
| 2007/0109571 A1* | 5/2007 | Kawamura | 358/1.9 |
| 2008/0198597 A1 | 8/2008 | Blumel | |
| 2011/0175946 A1* | 7/2011 | Chang et al. | 345/690 |
| 2012/0169795 A1* | 7/2012 | Hagood et al. | 345/690 |

* cited by examiner $V_A = V_S$
(eg. $V_A = V_S =$ GND)

$V_A \neq V_S$
(eg. $|V_A - V_S| > |V_{PI}|$)

Maximum brightness: $T_{open} = T_f - T_{reset} = (2^N - 1) \times t_0$

Arbitrary Grey Scale: $T_{open} = n \times t_0, 0 \leq n \leq (2^N - 1)$

MICRO-SHUTTER DISPLAY DEVICE

TECHNICAL FIELD

The present invention relates to micro-shutter display device, and particularly, to a micro-shutter display device capable of improving light usage efficiency, reducing power consumption, and providing sharp picture quality.

BACKGROUND ART

A liquid crystal display (LCD) device, a representative example of a display device, is used as a display device of almost every electronic device such as a display of a television, a monitor, or the like, a portable device such as a mobile phone, a portable multimedia player (PMP), an MP3 player, a digital camera, or the like, a public information display (PID) for displaying information in a public area, an indoor/outdoor advertisement display, or the like.

A general LCD device according to a conventional technique includes a plurality of pixels arranged in a two-dimensional (2D) matrix form. Here, each pixel includes transparent substrates facing each other, transparent electrodes formed on the substrates, and a liquid crystal encapsulated between the transparent electrodes. In case of a color display, color filters constituting sub-pixels are formed on the surfaces of the transparent substrates in order to express colors such as red, green, blue, and the like. Polarizer plates (or polarizer layers) which are perpendicular to each other and have polarization characteristics are disposed on both sides of the transparent substrates. At usual times, the polarizer plates block light irradiated from a backlight unit. However, when a voltage is applied to the liquid crystal, an alignment of the liquid crystal is rotated to change a phase of light and the polarizer plates allow light irradiated from the backlight unit to be transmitted. Also, in order to independently drive liquid crystal of the sub-pixel region, generally a thin film transistor (TFT) driving circuit is integrated in the form of a 2D matrix form on the lower transparent substrate constituting a liquid crystal panel.

In the LCD device, pixels constituting an image do not emit light by themselves. That is, the LCD device displays an image by intermitting illumination light irradiated from a back light source by combining two or more polarizer plates. In this case, a half or more of back light is lost by the polarizer plates and only about one-third of light which has passed through the polarizer plates after passing through spatially separated color filters is used for displaying an image, and since a light loss occurs due to other optical film factors, so in an optical aspect, an LCD device has very low light usage efficiency.

Meanwhile, demand for a display device which may be able to provide excellent picture quality even in an ambient light environment such as strong natural light, or the like, in a field related to a portable device such as a portable phone, a tablet computer, a personal digital assistant (PDA), a portable multimedia device, or the like, a public information display, and outdoor advertisement display device, or the like, is on the rise. However, the existing transmissive LCD device has a problem in which brightness of display finally output through liquid crystal and a plurality of polarizer plates after being irradiated from a backlight is relatively low in comparison to ambient brightness by natural light. Also, readability and visibility are very low due to an influence of ambient light reflected from a surface of a liquid crystal display. Also, even in the case of a TV, a computer monitor, or the like, employing an LCD device, visibility is degraded due to an environment such as intensive indoor illumination. There has been a method of increasing brightness of a back light source based on ambient light condition after detecting brightness of ambient light. However, there is a limitation in increasing brightness of a back light source due to efficiency of a light emitting element and a technical problem such as heating, or the like, and in this case, power consumption is also rapidly increased.

Meanwhile, in order to secure visibility even in a bright ambient light environment and reduce power consumption by a backlight unit, a reflective LCD device using bright ambient light such as natural light, or the like, as a light source has been developed. Like a general transmissive LCD device, a reflective LCD device includes a liquid crystal layer, a color filter, a polarization filter or a polarizer plate, a transparent substrate, and the like, and an operation principle for displaying an image is similar to that of a transmissive LCD device. However, in a reflective LCD device, color filter of a certain region is removed a reflective layer, or the like, is added. The reflective LCD device is different from the transmissive LCD device, in that light made incident from the outside through the region from which a color filter was removed is reflected through the reflective layer to adjust brightness through liquid crystal of each sub-pixel and allowed to pass through a color filter to display an image. Since the reflective LCD device does not require an additional light source, power consumption is low and readability can be improved even in a bright ambient light environment. However, the reflective LCD device has shortcomings in that a picture quality may be degraded in an indoor or dark environment.

Recently, a trans-reflective LCD device, or the like, has been studied and developed as an LCD device combining a reflective LCD device using ambient light and a transmissive LCD device using an existing back light illumination. However, in the trans-reflective LCD device, a region for a reflection operation and a region for a transmissive mode operation are areally divided and divided respective pixels of the display device are combined to be configured, so that a degradation of spatial resolution in case of transmissive mode driving and reflective mode driving cannot be avoided and a maximum light brightness cannot also be achieved in each mode. In particular, when the fact that portable devices such as portable phones, or the like, are used without being limited to places including indoor and outdoor areas and the fact that demand for low power consumption due to battery driving is increasing, and the like, are considered, a substitute for overcoming the limitation of the existing LCD devices is required.

DISCLOSURE OF THE INVENTION

Therefore, an object of the present invention is to provide a micro-shutter display device having enhanced light usage efficiency in comparison to a transmissive display device such as a liquid crystal display (LCD) device, or the like, according to the existing technology.

Another object of the present invention is to provide a micro-shutter display device capable of optimizing a transmission function based on back light and a reflection function using ambient light as a light source in a single display device and providing the same.

To achieve these and other advantages and in accordance with the purpose of the present invention, as embodied and broadly described herein, there is provided a micro-shutter display device according to one aspect of the present invention including: a light source emitting light; a lower substrate having an optical conversion unit performing at least any one of a function of converting back light output from a light source into primary colors corresponding to sub-pixels and a function of reflecting ambient light having a primary color band corresponding to sub-pixels; a micro-shutter opening and closing a path of light output from the optical conversion unit; and a driving circuit supplying a driving signal to a movable unit electrode or a fixed counter electrode, wherein the micro-shutter includes: a shutter micro-structure comprised of a shutter blade blocking light output from the optical conversion unit and a shutter aperture allowing light output from the optical conversion unit to be transmitted therethrough; an elastic element connected to the shutter micro-structure to provide elastic restoring force when the shutter micro-structure structure is driven; a movable unit electrode configured to be connected to the shutter micro-structure; and a fixed counter electrode spaced apart by a certain interval from the movable unit electrode.

The micro-shutter display device according to another aspect of the present invention may further include: a backlight unit irradiating back light.

In the micro-shutter display device according to another aspect of the present invention, the optical conversion unit may include at least one of: a light excitation light emitting unit made of a phosphor material for converting light from the light source into primary color light having a wavelength band corresponding to sub-pixels; a dichroic reflective layer reflecting the converted primary color light and allowing light from the light source which has not been converted to be transmitted therethrough; and a color filter of each sub-pixel allowing primary color light corresponding to sub-pixels to be transmitted therethrough.

In the micro-shutter display device according to another aspect of the present invention, the optical conversion unit may be disposed between the backlight unit and the micro-shutter, and the color filter is disposed between the light excitation light emitting unit and the micro-shutter.

In the micro-shutter display device according to another aspect of the present invention, the light excitation light emitting unit may be formed as nano-particles including at least one of quantum dots and nanorods.

In the micro-shutter display device according to another aspect of the present invention, when back light irradiates primary color light corresponding to the sub-pixels, the light excitation light emitting unit may be omitted.

In the micro-shutter display device according to another aspect of the present invention, the dichroic reflective layer may be a dichroic filter.

In the micro-shutter display device according to another aspect of the present invention, the lower substrate may include: a transparent substrate; a light blocking unit formed on one surface of the transparent substrate; and a transparent passivation layer protecting surfaces of the light blocking unit and the optical conversion unit, wherein a lower substrate reflective surface is formed between the transparent substrate and the light blocking unit and a lower substrate blackening surface performing a light blocking function is formed between the light blocking unit and the transparent passivation layer.

In the micro-shutter display device according to another aspect of the present invention, the backlight unit may include: a light guide plate element having a reflective layer and configured on a surface facing a junction surface with the lower substrate; and a light source irradiating back light to the light guide plate element.

In the micro-shutter display device according to another aspect of the present invention, the reflective layer may include a reflective pattern element having fine prominences and depressions.

In the micro-shutter display device according to another aspect of the present invention, the micro-shutter display device may further include: an ambient light detection sensor; and a control unit adjusting a quantity of light output from the light source based on measurement results of the ambient light detection sensor.

In the micro-shutter display device according to another aspect of the present invention, the lower substrate and the micro-shutter may be connected through at least one conductive fixing unit.

In the micro-shutter display device according to another aspect of the present invention, when a difference between a potential of the movable unit electrode and that of the fixed counter electrode is greater than a pull-in voltage, the shutter is open, and when there is no difference between the potential of the movable unit electrode and that of the fixed counter electrode, the shutter is closed, and when the different between the potential of the movable unit electrode and that of the fixed counter electrode is smaller than the pull-in voltage, the shutter is partially open at a point where restoring force of the elastic spring element and electrostatic force are balanced.

In the micro-shutter display device according to another aspect of the present invention, the driving signal may be applied according to any one of electrostrictive or piezoelectric driving method, an electrothermal driving method, an electromagnetic driving method, a driving method by a shape memory material, and a driving method by an electro-active polymer micro-structure.

In the micro-shutter display device according to another aspect of the present invention, a fluid for minimizing a difference between refractive indices of a light output surface of the lower substrate and a light incident surface of the upper substrate may be further included in a space between the lower substrate, the micro-shutter, and the upper substrate having the driving circuit.

In the display device according to an embodiment of the present invention, back light usage efficiency and transmission efficiency are enhanced in comparison to an existing display device, whereby an image having the same brightness can be displayed with low power consumption and a brighter image can be displayed with the same power consumption.

In the display device according to an embodiment of the present invention, a transmissive mode operation and a reflective mode operation are performed without lowering spatial resolution, whereby maximum light brightness can be achieved in each mode and visibility and readability can be secured even in various usage environments.

MODES FOR CARRYING OUT THE PREFERRED EMBODIMENTS

Figure 1A:
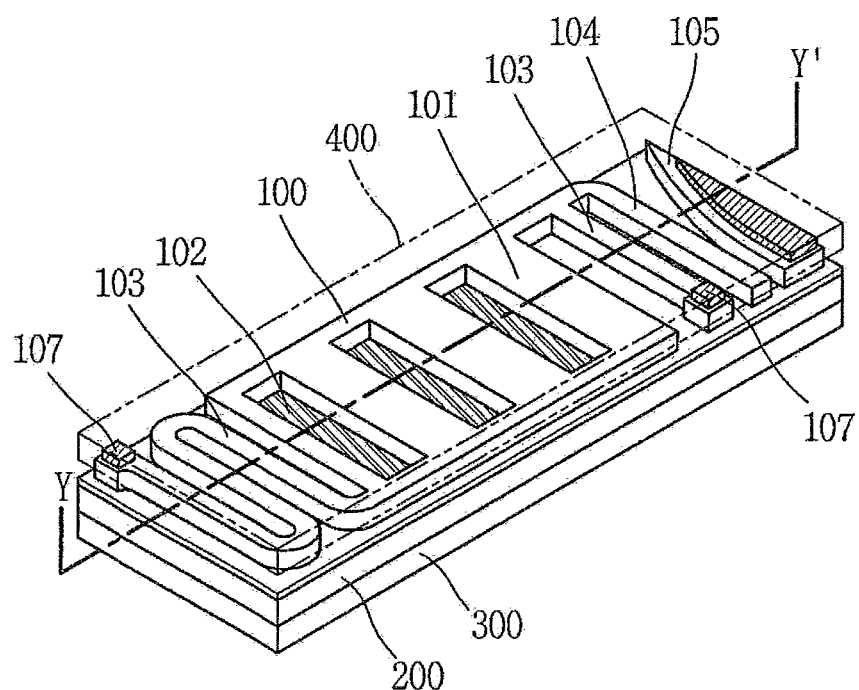
FIG. 1A is a perspective view of sub-pixels of a micro-shutter display device when a shutter is closed.

General terms which are widely used currently as possible in consideration of the functions of the present invention are selected as terms used in the present invention, but the terms may be changed according to an intention of a technical expert in the art, a precedent, an advent of a new technology, and the like. Also, in a particular case, there is a terminal arbitrarily set by an applicant of the present invention, and in this case, a meaning thereof will be described in detail in a corresponding description of the present invention. Thus, it is appreciated that terms used in the present invention should be defined based on a meaning of the term and general content of the present invention, rather than as a name of a simple term.

Throughout the specification, unless explicitly described to the contrary, the word "comprise" and variations such as "comprises" or "comprising", will be understood to imply the inclusion of stated elements but not the exclusion of any other elements.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is a view showing a sub-pixel structure of a micro-shutter display device when a shutter is closed.

FIG. 1A is a perspective view of sub-pixels of a micro-shutter display device when a shutter is closed. With reference to FIG. 1A, the micro-shutter display device includes a backlight unit 300 for irradiating back light, a lower substrate 200 having an optical conversion unit for converting back light or ambient light into respective primary colors corresponding to sub-pixels, a micro-shutter 100 for opening and closing a path of light output from the optical conversion unit, and an upper substrate 400 including an electrode array or a thin film transistor driving circuit.

Figure 1B:
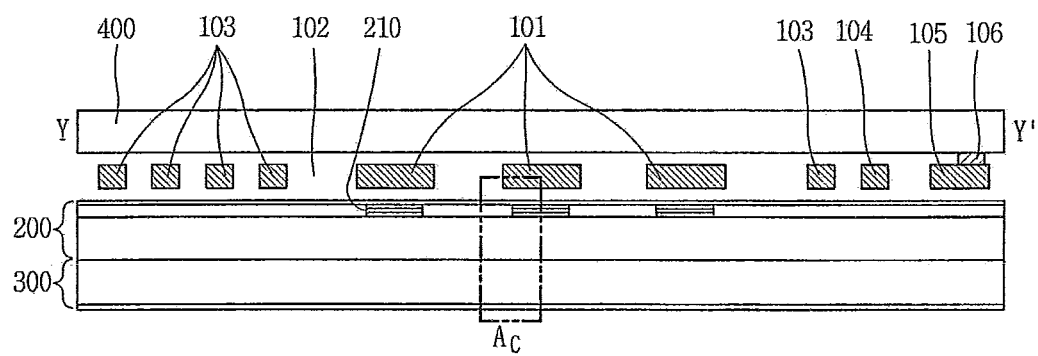
FIG. 1B is a sectional view taken along line Y-Y' of sub-pixels of the micro-shutter display device in a state in which the shutter is closed.

FIG. 1B is a sectional view taken along line Y-Y' of sub-pixels of the micro-shutter display device in a state in which the shutter is closed. With reference to FIGS. 1A and 1B, the micro-shutter includes a movable micro-structure having a thin plate shape and including a shutter blade 101 and a shutter opening 102, and a fixed micro-structure providing driving force to the movable micro-structure.

The movable micro-structure includes a shutter micro-structure including the shutter blade 101 and one or more shutter openings 102 adjacent to the shutter blade 101, an elastic spring element 103 connected to the shutter micro-structure, and a movable unit electrode 104 integrated to one outer surface of the movable micro-structure and facing a fixed counter electrode 105 of the fixed micro-structure. The movable micro-structure may be mechanically joined and fixed with the upper substrate 400 or the lower substrate 200 by a movable micro-structure fixing unit 107 in a certain region of an end portion of the elastic spring element 103. Also, the movable micro-structure is spaced apart by a certain gap from a surface of the lower substrate 200 and the upper substrate 400 and suspended. Meanwhile, the shutter blade may block output light 2 by back light converted as it transmits through the region of the optical conversion unit 210 or block ambient light so that it cannot reach the optical conversion unit. Also, when the shutter micro-structure is driven and displaced, the elastic spring element 103 may provide restoring force opposite to the direction of the displacement. Also, the movable micro-structure fixing unit 107 may perform mechanical joining of the movable micro-structure and the upper or lower substrate and transfer a driving electrical signal to the movable micro-structure. Also, the movable unit electrode 104 may be connected to the elastic spring element 103 and provide driving force for generating a displacement of the movable micro-structure.

The fixed micro-structure is provided by connecting the fixed counter electrode 105 and a fixed counter electrode structure fixing unit 106 serving as an anchor mechanically joining the fixed counter electrode to the upper substrate 400 or the lower substrate 200. The fixed counter electrode structure fixing unit 106 may also provide a mechanical joining function and serve as an electrical wire electrically connecting (feedthrough) a driving electrical signal to the fixed counter electrode 105.

Meanwhile, driving force for operating the movable micro-structure is generated by the movable unit electrode 104 and the fixed counter electrode 105 provided to face the movable unit electrode, and a detailed operation thereof will be described later.

Figure 1C:
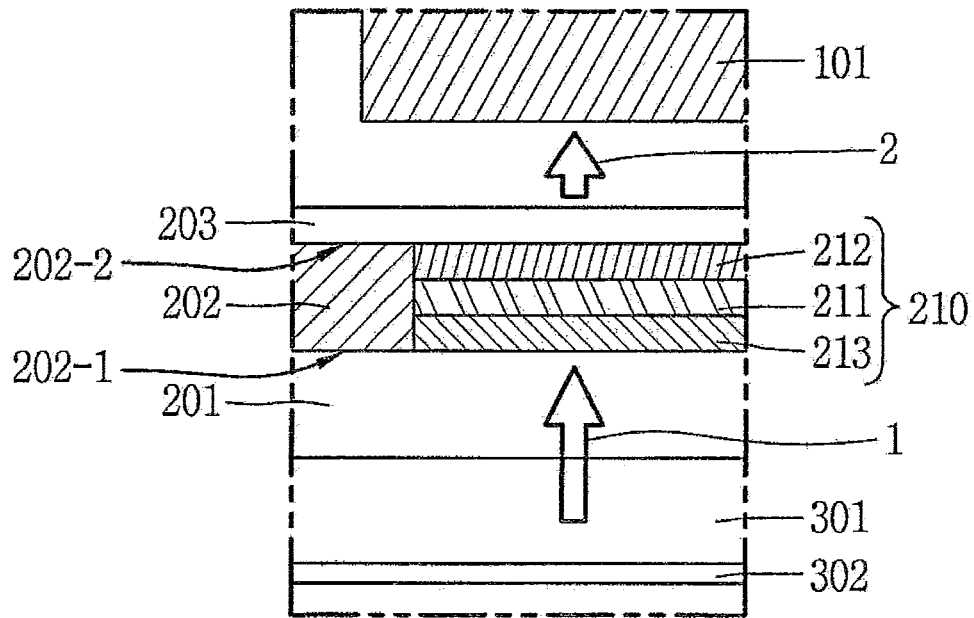
FIG. 1C is a schematic view showing a structure for displaying a primary color of each sub-pixel and an operational principle.

FIG. 1C is a schematic view showing a structure for displaying a primary color of each sub-pixel and an operational principle, which illustrates a state in which primary color light 2 of a corresponding pixel converted by the optical conversion unit 210 is blocked by the shutter blade 101.

With reference to FIG. 1C, in order to uniformly guide back light to the entire screen region, the backlight unit 300 may include a transparent material light guide plate 301 and a reflective layer 302 provided on a lower surface of the transparent material light guide plate 301 and having high reflectivity. The lower substrate 200 may include a transparent substrate 201, an optical conversion unit 210 for converting back light or ambient light to each primary color corresponding to sub-pixels, a light blocking unit 202 formed on one surface of the transparent substrate 201, and a transparent passivation layer 203 for protecting a surface of the light blocking unit 202 against discoloration and deformation due to an external environment. Meanwhile, a lower substrate reflective surface 202-1 for reflecting back light is formed on an interface of the light blocking unit 202 formed in a certain region of the surface of the transparent substrate 20 and the transparent substrate 201, and a lower substrate blackening surface 202-2 may be formed to blacken the light blocking unit material surface. Or, an upper surface of the light blocking unit in contact with the transparent passivation layer may include a black matrix capable of minimizing reflection according to ambient light. The optical conversion unit 210 may include a light excitation light emitting unit 211 made of a fluorescent material for converting the backlight to primary color light corresponding to a sub-pixel, a dichroic reflective layer 213 allowing the converted primary color light to be reflected and non-converted backlight to be transmitted therethrough, and a sub-pixel color filter 212 allowing the converted primary color light to be transmitted therethrough. Meanwhile, the light excitation light emitting unit 21 preferably, includes a phosphor material having a narrow full width at half maximum (FWHM) and emitting a light of a peak wavelength saturated in each primary color in a color coordinate system of a visible light region. Also, according to an embodiment of the present invention, the light emitting unit may include a structure configured by applying quantum dot matrix phosphors containing quantum dot ensembles or quantum dots having light emission characteristics corresponding to respective sub-pixels. Also, the light excitation light emitting unit 21 may be configured according to required primary colors of each sub-pixel based on nano particles including quantum dots, nanorods, or the like, which have nanometer-level diameter and are a semiconductor excitation light emitting material.

According to an embodiment of the present invention, the backlight may be multi-reflected by the reflective layer 302 and the lower substrate reflective surface 202-1 between the transparent material light guide plate 301 and the transparent lower substrate 201. The backlight may be made incident to a light aperture of the lower substrate in which the light blocking unit 202 is not formed through the multi-reflection. Thus, the ratio of quantity of light of individual primary color output to the micro-shutter from the lower substrate over the quantity of backlight can be increased through the multi-reflection. Also, a backlight assembly may be configured by coupling a light guide plate element and the lower substrate, and a reflective layer may be bonded to or stacked on a lateral surface of the backlight unit assembly excluding a region to which light is made incident from backlight source to improve backlight usage efficiency. Also, the reflective layer may include the path of reflective light to direct toward the lower substrate, and in order to enhance uniformity of a brightness distribution of the entire screen, the reflective layer may include a reflective pattern element having a plurality of fine prominences and depressions.

The light excitation light emitting unit includes phosphors emitting wavelength-converted light by using incident light as excitation light, as a photoluminescence material. By the light excitation light emitting unit 211, the backlight is converted into an image display primary color light 2, one of red, green, and blue with respect to a corresponding sub-pixel. The dichroic reflective layer 213 implemented as an optical element such as a dichroic mirror/filter, or the like, allowing a wavelength band of the backlight to be transmitted and reflecting the other converted wavelength region in relation to a component directing toward the lower backlight unit may be further included between the transparent substrate 201 and the light excitation light emitting unit 211. A corresponding sub-pixel color filter 212 allowing a band of converted primary color light to be transmitted may be stacked at an upper portion of the light excitation light emitting unit 211. The color filter 212 allows only light corresponding to a corresponding sub-pixel, so it is required when a full color reflecting function is provided to the display device according to an embodiment of the present invention. When the display device according to an embodiment of the present invention is operated as a transmission type or monochrome reflective display device, the color filter 212 may be omitted. Preferably, the transparent passivation layer 203 on which a transparent thin film is stacked is added to the surface of the optical conversion unit 210 and the light blocking unit 202 in order to prevent discoloration and deformation. Also, an upper surface of the light blocking unit 202 in contact with the transparent passivation layer 203 may be formed to include a black matrix to minimize reflection according to ambient light, or a lower substrate blacking surface 202-2 may be formed by blacking the light blocking unit material surface. Similarly, it is preferred to blacken the surface of the micro-shutter 100 facing the upper substrate 400.

Meanwhile, a fluid for minimizing a difference between refractive indices of a light output surface of the lower substrate 200 and a light incident surface of the upper substrate 400 may be further included in a space between the lower substrate 200, the micro-shutter 100 and the upper substrate 400. In this case, a loss of light such as diffusion of light, total reflection, and the like, that may be generated on the respective interfaces can be reduced and an image distortion can be reduced to provide a clearer image.

FIG. 2 is a view showing a shutter open state in which shutter micro-structure with a shutter blade formed thereon is moved when electrostatic force is generated as a driving voltage is applied to between the movable unit electrode and the fixed counter electrode of the micro-shutter.

Figure 2A:
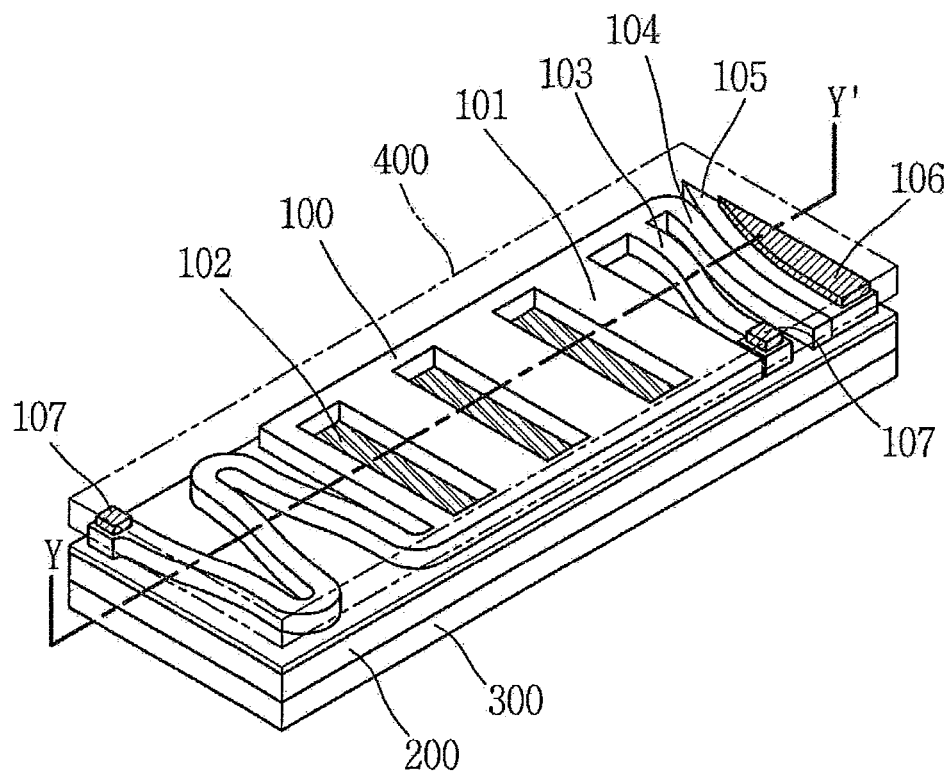
FIG. 2A is a perspective view of sub-pixels of a micro-shutter display device when the shutter is open.
Figure 2B:
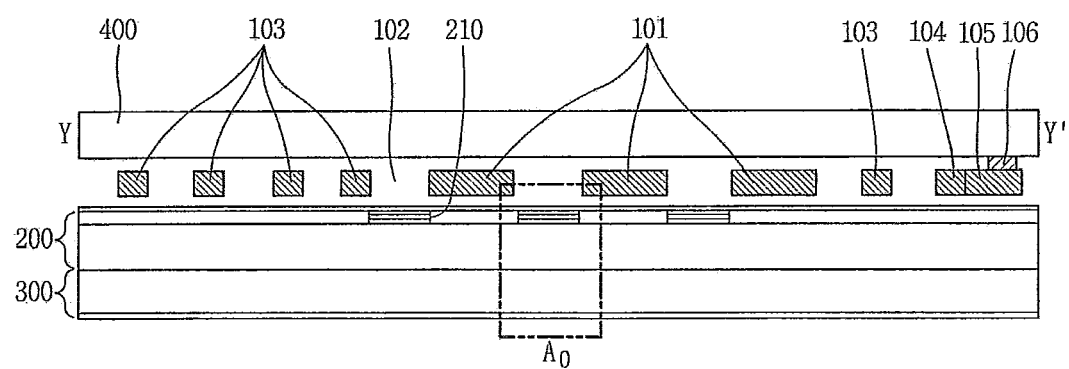
FIG. 2B is a sectional view taken along line Y-Y' of sub-pixels of the micro-shutter display device in a state in which the shutter is open.

FIG. 2A is a perspective view of sub-pixels of a micro-shutter display device when the shutter is open. FIG. 2B is a sectional view taken along line Y-Y' of sub-pixels of the micro-shutter display device in a state in which the shutter is open.

In the shutter open state, a detail configuration thereof is the same as the shutter closed state, except that the micro-shutter is open, so a detailed description of the configuration will be omitted. Also, an optical conversion principle using back light as excitation light is the same as that described above, so a description thereof will be omitted.

According to an embodiment of the present invention, when the shutter micro-structure moves, the shutter open/closed state can be changed, and in the shutter open state, the primary color right 2 of sub-pixels output from the optical conversion unit 210 may be transmitted through the light opening between the shutter blade 101. The shutter micro-structure may be moved by electrostatic force generated when a driving voltage is applied between the movable unit electrode 104 and the fixed counter electrode 105. Meanwhile, the surface of the conductive micro-shutter structure including the contact surface of the movable unit electrode 104 and the fixed counter electrode 105 may further include an electrical insulator.

According to an embodiment of the present invention, the shutter micro-structure may be moved in a direction parallel to the surface of the upper and lower substrates by attractive force according to electrostatic force generated by a driving voltage applied to the movable unit electrode 104 and the fixed counter electrode 105. When the driving voltage is released such that the voltage of the movable unit electrode and the fixed counter electrode 105 (e.g., such that it has a ground potential), the micro-shutter 100 structure is returned to a normal state due to restoring force of the elastic spring element 103 which has been elastically deformed to correspond to displacement of a shutter blade. In general, driving displacement of the shutter blade is determined at a point where the electrostatic force according to the driving voltage and the restoring force according to the elastic spring element. Thus, an aperture ratio of a light path by the micro-shutter 100 according to an embodiment of the present invention is controlled according to the size of a driving voltage, and a gray scale or brightness of primary color light output from the optical conversion unit may be controlled an analog driving method. However, when the characteristics deviation of a plurality of individual elements of the micro-shutter 100 integrated for each sub-pixel and non-uniformity characteristics, or the like, in the entire image region of driving power of the upper substrate 400 are considered, the analog driving method may cause non-uniformity characteristics in the image region so an auxiliary unit for complementing the non-uniformity is required. Thus, a digital driving method that is able to easily secure the same driving characteristics within the entire image display region and can be implemented by a simple driving circuit is preferred. A detailed digital driving principle will be described in a part where a micro-shutter driving waveform is described.

Figure 2C:
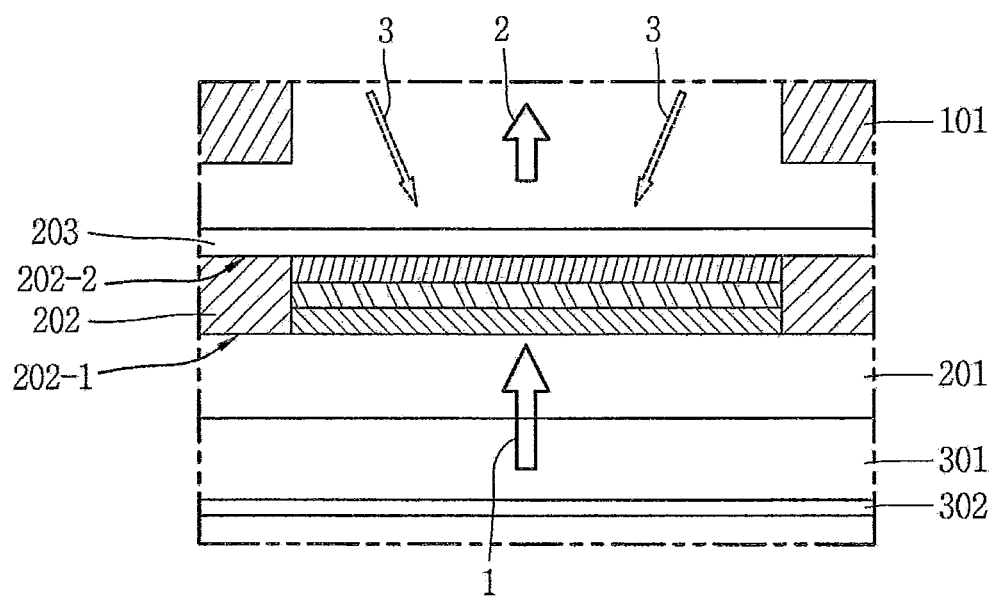
FIG. 2C is a detailed view of Ao region of FIG. 2B in which a light aperture of the micro-shutter is aligned with an optical conversion unit of a lower substrate to output primary color light of sub-pixels.

FIG. 2C is a detailed view of Ao region of FIG. 2B in which a light aperture of the micro-shutter 100 is aligned with the optical conversion unit of the lower substrate 200 to output primary color light 2 of sub-pixels. With reference to FIG. 2C, when a defective mode operation is performed in a shutter open state, ambient light 3 made incident from the outside is irradiated to the optical conversion unit 210 and a color band of a corresponding primary color is reflected from a color filter provided in the optical conversion unit to thus display the primary color light 2 corresponding to image information of individual sub-pixels on the screen. Also, the dichroic reflective layer 213 provided on a lower surface of the optical conversion unit may enhance primary color reflecting efficiency of each sub-pixel incase of using ambient. When ambient light is strong like an outdoor natural light environment in a fine day, an image may be displayed only through reflective mode driving without using the back light 1. Also, when intensity of ambient light is not sufficient like an indoor illumination environment, the intensity of back light 1 is lowered to an appropriate level and reflection by ambient light is utilized, thereby reducing power consumption of the display device.

FIGS. 1 and 2 show the configuration of the optical conversion unit of each sub-pixel using a back light source different from primary colors constituting the display device. However, according to an embodiment of the present invention, when a back light source is formed to have a band identical to that of the primary colors of the display device such as a blue light emitting diode, or the like, the blue light excitation light emitting layer 211 may be omitted in the structure of the sub-pixels expressing red and green colors. Also, when only the transmissive mode function is used without applying the reflective mode function, the color filter 212 of respective sub-pixels of red, green, and blue may be omitted.

Figure 3A:
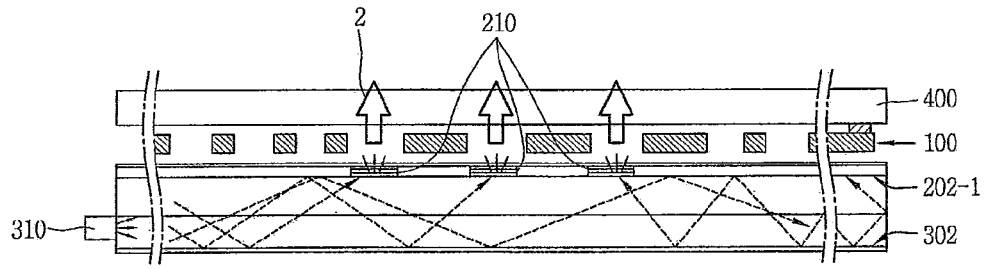
FIGS. 3A and 3B are views showing a shutter open state and a shutter closed state of the micro-shutter display device during a transmissive mode operation.
Figure 3B:
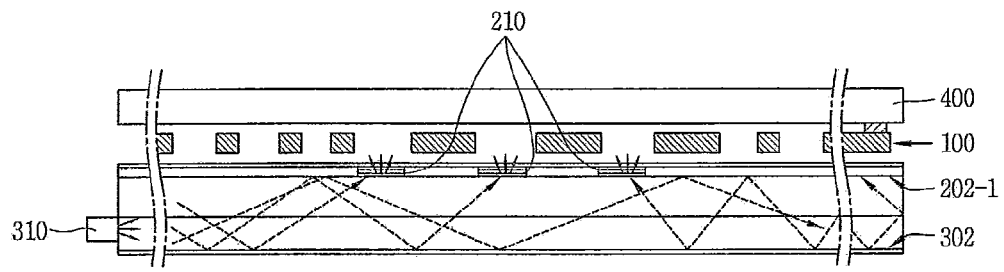

FIGS. 3A and 3B are views showing a shutter open state and a shutter closed state of the micro-shutter display device during a transmissive mode operation.

As shown in FIG. 3A, back light 1 output from a backlight source 310 is multi-reflected between the lower substrate reflective surface 202-1 of the lower surface of the light blocking unit 202 provided on the lower substrate 200 and the reflective layer 302 of the backlight unit 300. The multi-reflected back light is output toward the upper substrate 400 from the light aperture region where the light blocking unit 202 is not formed. During the output process, the back light is converted into any one of red light, green light, and blue light required for corresponding sub-pixels through the optical conversion unit 210 integrated in the light aperture region. The corresponding sub-pixels are spatially divided. That is, in the shutter open state in which the light aperture of the micro-shutter 100 is driven to be aligned with a light path output from the optical conversion unit, primary color elements of the corresponding sub-pixels are displayed according to a driving signal of the individual sub-pixels required for the entire image display. Also, in the shutter closed state in which the light blocking unit of the micro-shutter 100 blocks the light path output from the optical conversion unit, a black state in which primary color elements of corresponding sub-pixels are not displayed is implemented. When the rate of the state of FIG. 1A and the state of FIG. 1B is controlled during a unit frame continuation time as a display unit of an image such that a gray scale required for each sub-pixel is expressed, a transmissive display device capable of displaying a full color image can be provided.

Figure 3C:
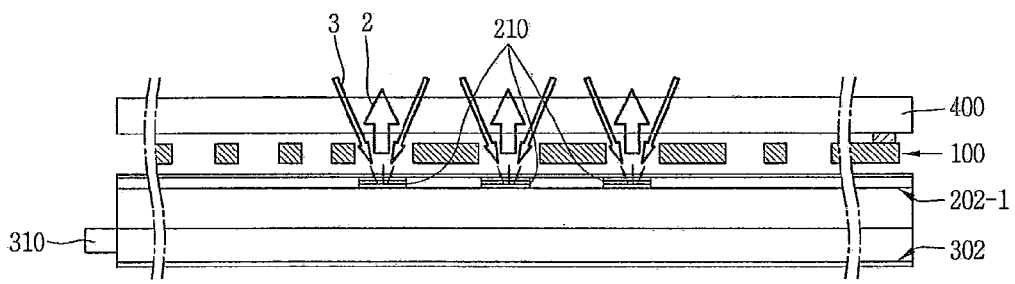
FIG. 3C is a view showing a reflective mode operation when ambient light 3 is used as an illumination light source without back light in the micro-shutter display device.

FIG. 3C is a view showing a reflective mode operation when ambient light 3 is used as an illumination light source without back light in the micro-shutter display device. With reference to FIG. 3, when natural light or indoor illumination light having high brightness are made incident to the micro-shutter display device in the shutter open state, a primary color wavelength band required for the corresponding sub-pixels is reflected by a color conversion function provided in the optical conversion unit to thus display a color. Although not shown, in the shutter closed state in which the light blocking unit of the micro-shutter blocks ambient light 3 from reaching the optical conversion unit, the corresponding sub-pixels are displayed in black. In order to display the entire image display, an image control signal for each individual sub-pixel required for configure an image drives the micro-shutter. And, by combining a continuation ratio of the shutter open state and the shutter closed state such that it fits the image control signal within a unit image frame continuation period, a gray scale of the primary colors of each sub-pixel or brightness can be adjusted.

Figure 3D:
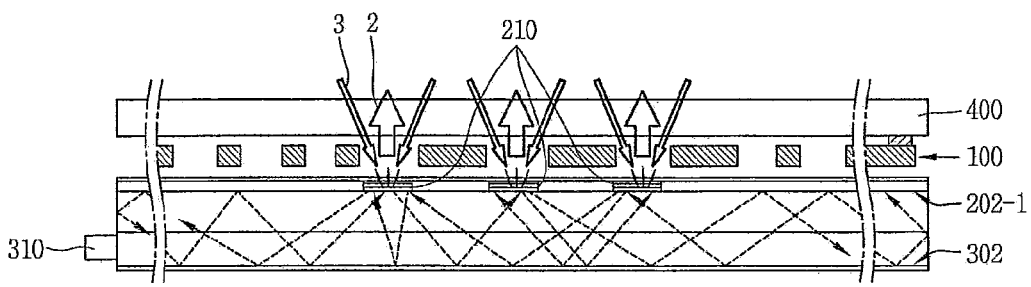
FIG. 3D is a view showing a reflective mode operation in a blue sub-pixel among respective sub-pixels expressing primary colors in the micro-shutter display device using blue light as a back source light.

FIG. 3D is a view showing a reflective mode operation in a blue sub-pixel among respective sub-pixels expressing primary colors in the micro-shutter display device using blue light as the back source light 310. According to an embodiment of the present invention, when back light has blue color, red and green sub-pixels are implemented by a transmissive mode operation through a wavelength conversion of back light in the optical conversion unit. Also, the principle of implementing a reflective mode operation using ambient light is the same as described above. However, in the case of blue sub-pixel, color of back light 1 is not required to be converted.

Thus, in the blue sub-pixel of the transmissive mode operation, back light is not converted but transmitted, and in the reflective mode operation, the optical conversion unit of the blue sub-pixel reflects a certain ratio of the ambient light component of the blue band and allows the remaining to be transmitted to the light guide plate element, whereby ambient light can be utilized as illumination light in the entire screen region. Also, primary colors of the blue sub-pixels and gray scale representation can be made in the same manner as that of the driving method of the micro-shutter as described above.

Figure 4A:
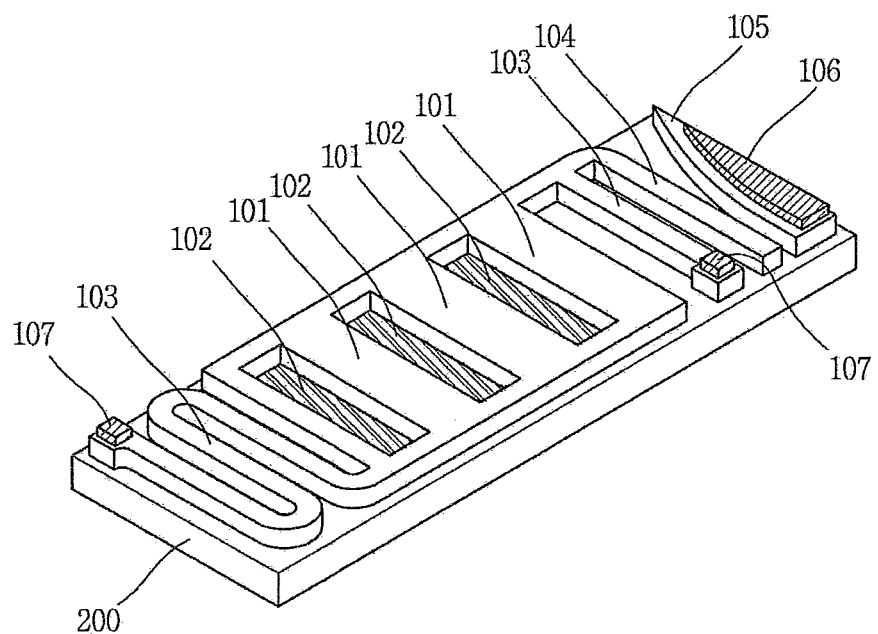
FIG. 4A is a view showing a state in which a micro-shutter is closed in the primary color sub-pixel constituting a unit pixel.
Figure 4B:
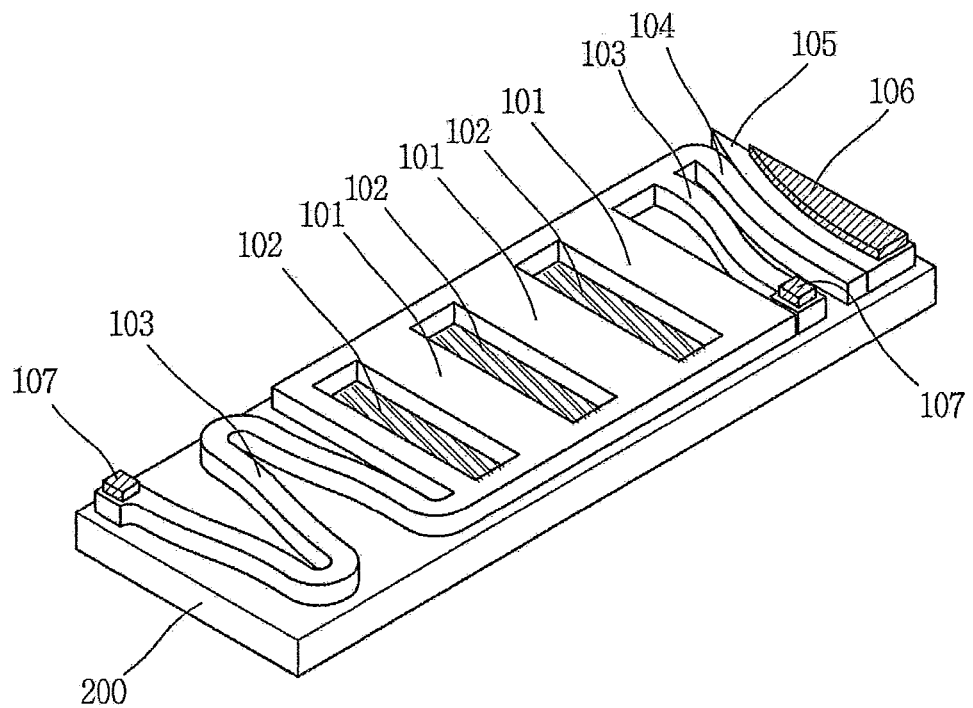
FIG. 4B is a view showing a state in which a micro-shutter is open in the primary color sub-pixel constituting a unit pixel.

FIG. 4 is a perspective view illustrating a detailed operation of the micro-shutter 100 provided in each individual sub-pixel. FIG. 4A is a view showing a state in which a micro-shutter is closed in the primary color sub-pixel constituting a unit pixel. FIG. 4B is a view showing a state in which a micro-shutter is open in the primary color sub-pixel constituting a unit pixel.

With reference to FIG. 4A, in the state in which the micro-shutter is closed, the micro-shutter allows back light to be transmitted or blocks ambient light from being blocked to display black color. With reference to FIG. 4B, in the state in which the micro-shutter is open by a driving electrical signal, the micro-shutter is allowed to transmit rear light and reflect ambient light to thus display primary colors. Namely, a light path of the primary color light output through the optical conversion unit is blocked or opened according to driving displacement of the shutter aperture 102 and the shutter blade 101. The micro-shutter in the drawing is an in-plane driving element in which displacement is made in the direction of the plane of the substrate on which the micro-structure is installed. The micro-structure may use electrostatic force according to a potential difference as driving power.

Figure 5A:
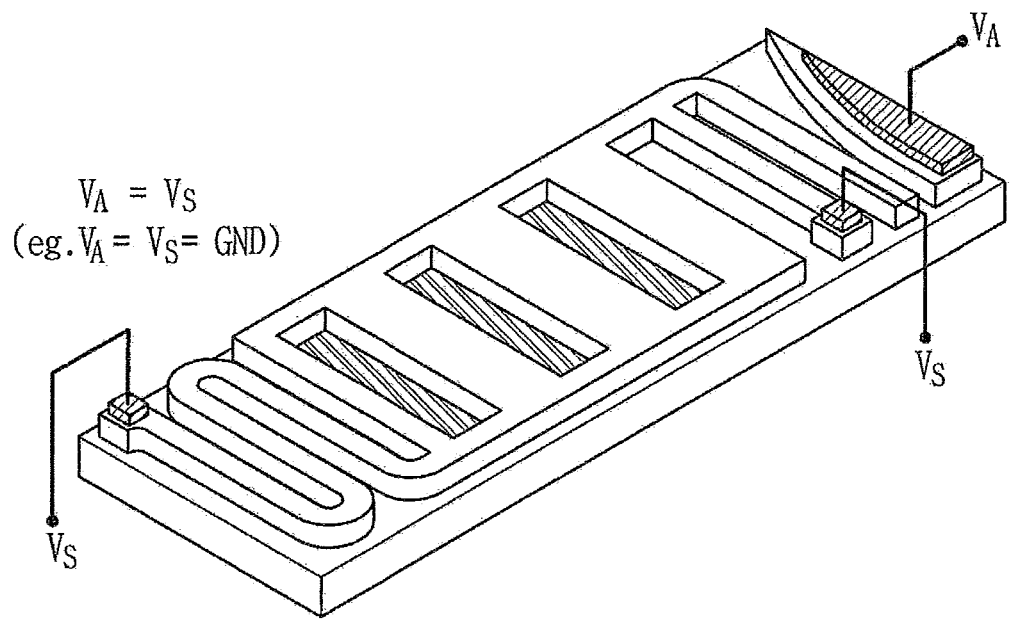
FIGS. 5A and 5B are views showing examples of a method of applying input electricity driving signal for driving individual sub-pixels.
Figure 5B:
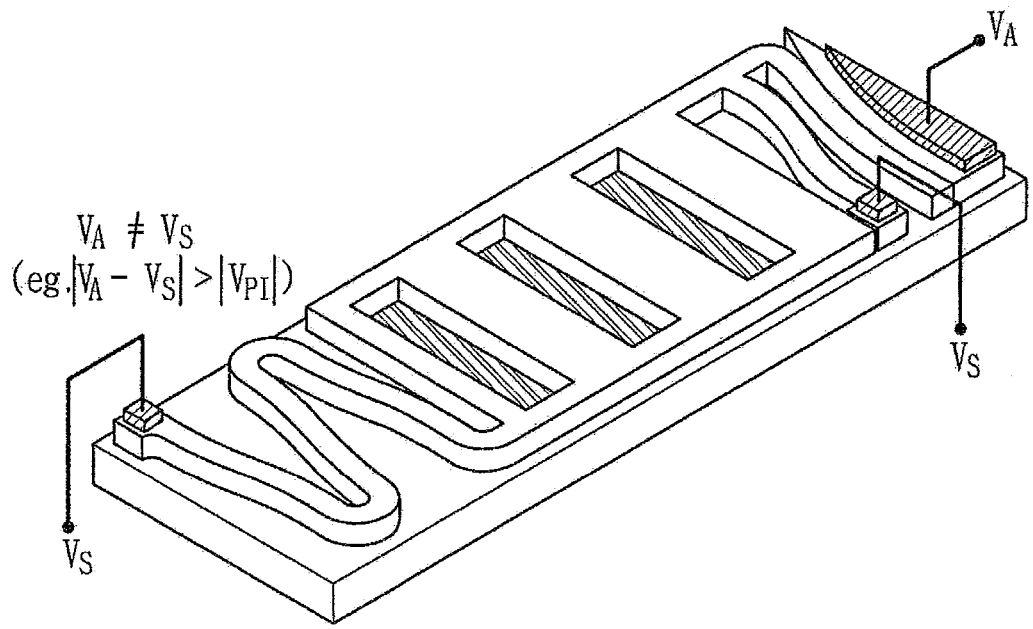

FIG. 5 is a view showing an example of a method for applying an input electrical driving signal for driving individual sub-pixels. FIG. 5A shows a state in which the micro-shutter is closed when driving force is not generated as an actuation voltage ($V_A$) is controlled to be equal to a shutter voltage ($V_S$) applied to the movable unit. Also, when the shutter voltage ($V_S$) is connected to a ground level and the actuation voltage ($V_A$) is also connected to the ground level, a corresponding state is a normal state. FIG. 5B shows a shutter open state in which the movable micro-structure is moved by electrostatic force when the actuation voltage ($V_A$) is different from the movable unit shutter voltage ($V_S$). In this case, the movable unit shutter is moved by the electrostatic force according to a difference between the actuation voltage ($V_A$) and the movable unit shutter voltage ($V_S$), and displacement is determined at a certain position where restoring force generated by deformation of the elastic spring element 103 and electrostatic force are balanced. In general, in case of an electrostatic force driving element, electrostatic force is non-linearly rapidly increased as an interval between two facing electrodes is reduced. And, the restoring force of the elastic spring has characteristics that it is linearly proportional to displacement, so when the displacement exceeds a particular limit and the interval between the driving elements is reduced to below a critical gap distance, the movable structure is rapidly pulled to the fixed electrode. A voltage at which the movable structure is rapidly pulled to fixed electrode is called a so-called pull-in voltage ($V_{PI}$). The pull-in voltage corresponds to a threshold voltage for an entirely open state. Thus, according to an embodiment of the present invention, preferably, the actuation voltage of the micro-shutter 100 higher than the pull-in voltage ($V_{PI}$) is applied.

FIG. 6 is a view showing an embodiment of application waveforms of actuation voltages ($V_S$) for shutter driving. The driving waveforms are used for digital driving representing multi-stage gray scales by time-dividing the two states of the open state and the closed state of the micro-shutter 100. In this drawing, the micro-shutter configured as a normally close element maintaining a shutter closed state when driving power is not applied will be described. However, the same principle can be applied to a case of a micro-shutter display device including a normally open element.

Figure 6A:
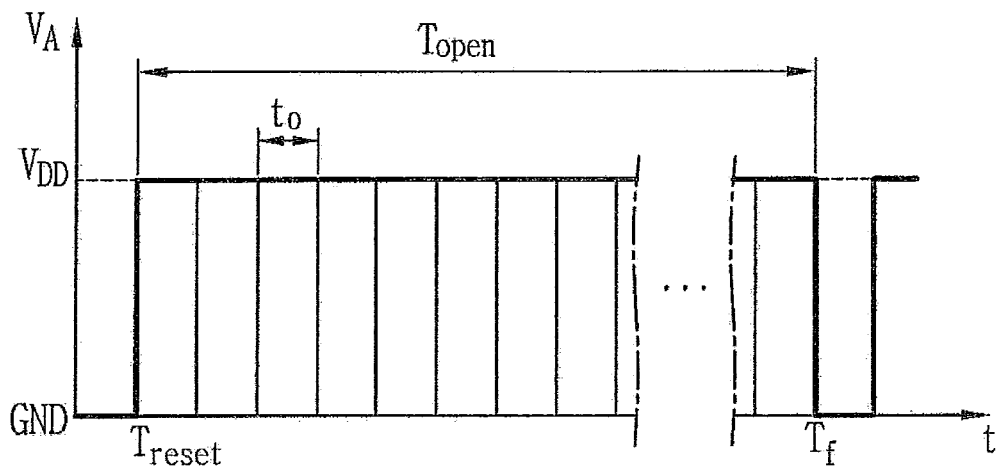
FIGS. 6A and 6B are views showing embodiments of driving voltage ($V_A$) application waveforms for driving a shutter.
Figure 6B:
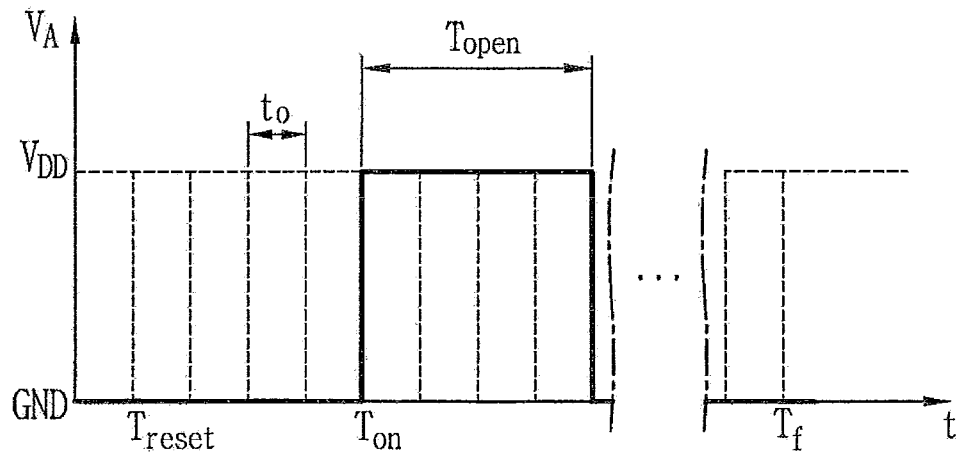

FIG. 6A is a view showing a driving voltage waveform of the liquid micro-shutter when a primary color of sub-pixels expressed by N-bit gray scales is displayed with maximum brightness, and FIG. 6B is a view showing a driving voltage waveform of the micro-shutter when a primary color of sub-pixels available for expressing by N-bit gray scales is displayed by a certain gray scale (a gray scale corresponding to a certain integer between 0 and ($2^N-1$).

With reference to FIGS. 6A and 6B, a period of a unit image frame is indicated as $T_f$, and an initialization interval for each image frame such as converting an image signal corresponding to an individual sub-pixel into a driving signal during a certain time and initializing the micro-shutter 40 into a driving standby state, or the like, is indicated as $T_{reset}$. A time interval obtained by subtracting the frame initialization interval $T_{reset}$ from the image frame period $T_f$ may be allocated for representing a primary color gray scale of an individual sub-pixel. In case of the shutter closed state in the entire image gray scale representation section, the corresponding sub-pixel can express black having minimized brightness and saturation. When primary color light of a corresponding sub-pixel is output in the shutter open state in the entire gray scale representation section, a primary color having the highest saturation of ($2^N-1$) stage that can be expressed in the corresponding sub-pixel can be expressed. A time t0 obtained by dividing the allocated gray scale representation interval ($T_f-T_{reset}$) by the maximum gray scale stage ($2^N-1$) desired to be expressed is determined to be a minimum width of a micro-shutter unit driving pulse for a gray scale representation. A shutter open driving voltage $V_A$ is allocated to a certain interval and applied within a gray scale representation interval within a frame period during an interval $T_{open}$ in which the unit driving pulse width is an integer multiple between 0 and ($2^N-1$), and a certain gray scale may be represented by maintaining a driving voltage such that the shutter closed state is maintained in the other remaining gray scale representation section. A driving electrical signal for displaying an image of the micro-shutter 100 for each individual sub-pixel of the micro-shutter display device according to an embodiment of the present invention may be supplied by an electrode arrangement or a thin film transistor circuit integrated and formed on the upper substrate 400. In this case, a driving voltage for opening the shutter may be easily implemented by using the power source voltage VDD and a ground GND potential of the integrated circuit of the upper substrate. Also, $T_{on}$ means a timing at which the micro-shutter 100 for each pixel is changed to an open state. Preferably, Ton is optimized and determined in an image frame so that the corresponding gray scale can be most naturally recognized by a viewer. Also, such a gray scale representation may be variably implemented according to a user need.

Figure 7A:
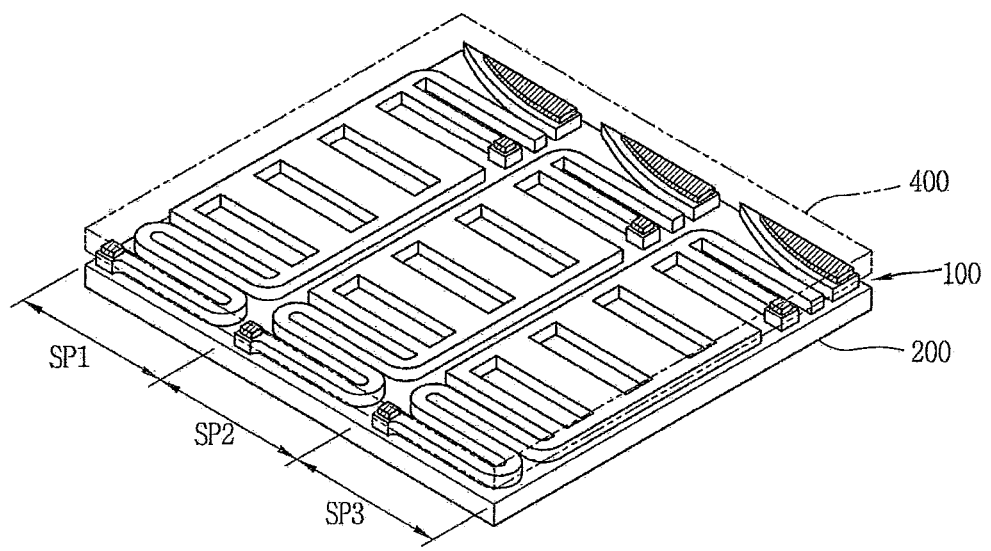
FIG. 7A is a view showing a structure of a pixel of a micro-shutter display device according to an embodiment of the present invention comprised of sub-pixels SP1, SP2, and SP3 expressing red, green, and blue colors.
Figure 7B:
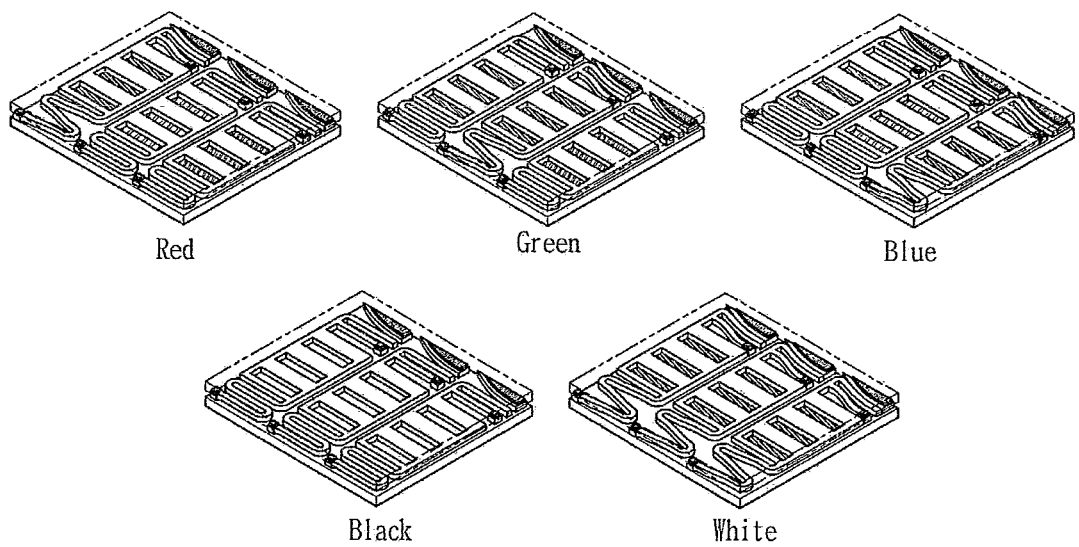
FIG. 7B is a view schematically showing a principle of implementing full color in the pixel.

FIG. 7 is a view showing an example of a pixel configuration of the micro-shutter display device and a color display method. FIG. 7A is a view showing a structure of a pixel of a micro-shutter display device according to an embodiment of the present invention comprised of sub-pixels SP1, SP2, and SP3 expressing red, green, and blue colors. FIG. 7B is a view schematically showing a principle of implementing full color in the pixel.

In the micro-shutter display device according to an embodiment of the present invention, pixels having a configuration as shown in FIGS. 7A and 7B are arranged in a two-dimensional matrix form on a screen region. With reference to FIG. 7B, red, green, and blue are displayed by driving sub-pixels corresponding to respective primary colors in a shutter open state, and black is expressed by maintaining all the sub-pixels in a shutter closed state. Also, white may be implemented by mixing primary colors by driving all the sub-pixels in a shutter open state. In order to express natural full color, a gray scale of individual primary colors or brightness should be expressed. To this end, gray scale of an image display color required for individual sub-pixels can be represented by independently driving a micro-shutter of an individual sub-pixel.

Figure 8A:
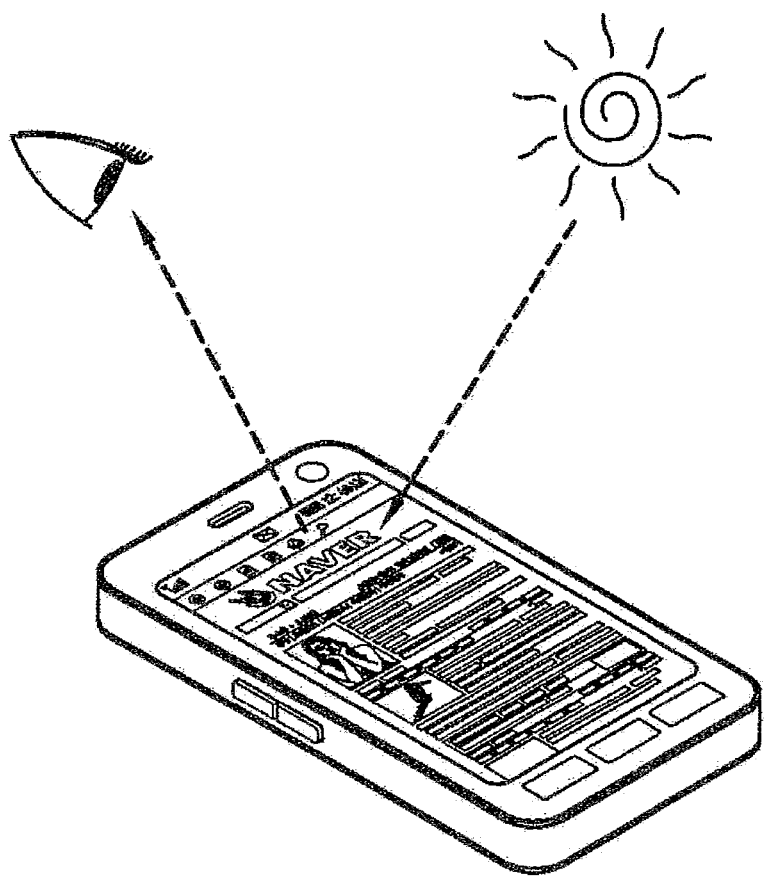
FIGS. 8A and 8B are views showing usage examples of applying the micro-shutter display device according to an embodiment of the present invention to a portable electronic device.
Figure 8B:
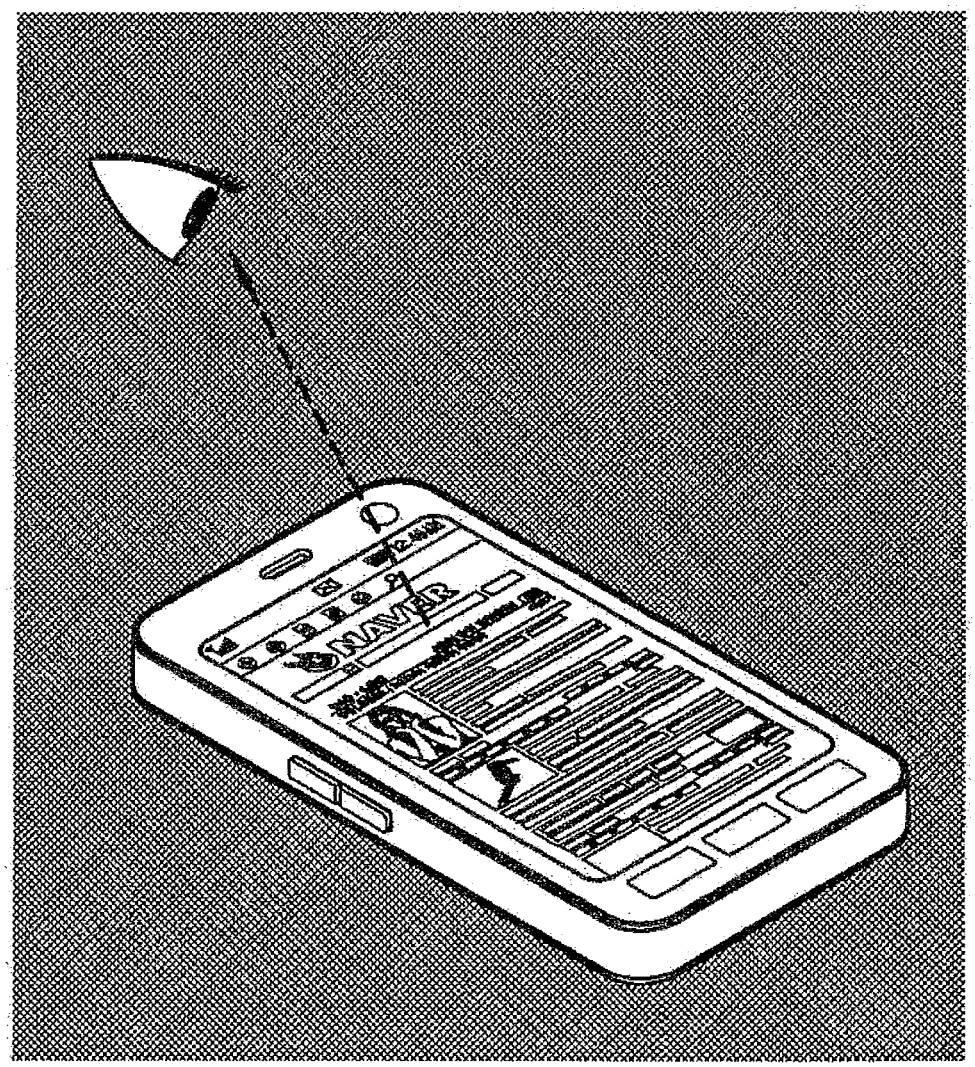

FIG. 8 is a view showing a usage example of applying the micro-shutter display device according to an embodiment of the present invention to a portable electronic device. FIG. 8A schematically shows a reflective full color screen display operation in a strong ambient light environment, and FIG. 8B illustrates an operation of displaying transmissive full color by backlight. The user can select whether to change a screen display method according to an ambient light environment as described above. Also, the display device may detect ambient light to automatically change a screen display method.

Figure 9:
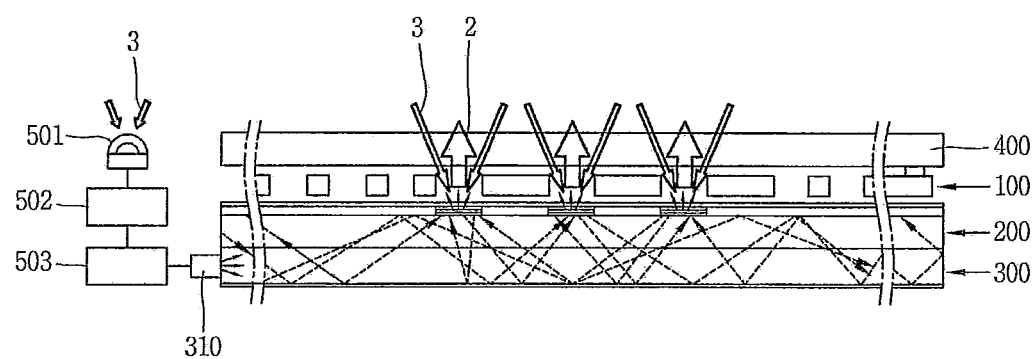
FIG. 9 is a view showing a configuration obtained by combining a unit for sensing an ambient light environment and adjusting a light output of a back light source based on the sensed ambient light environment to thus optimize image display contribution ratios of a transmissive mode operation and a reflective mode operation and use the both of the optimized ratios.

FIG. 9 is a view showing a configuration obtained by combining a unit for sensing an ambient light 3 environment and adjusting a light output of a backlight source 310 based on the sensed ambient light environment to thus optimize an image display contribution ratio of a transmissive mode operation and a reflective mode operation and use the both of the transmissive mode operation and the reflective mode operation. With reference to FIG. 9, as an example of an environment adaptive display device, a photo sensor 501 for sensing intensity of light of ambient light, or the like, a logical calculation unit 502 for calculating an optimum condition such as determining a light output level of a backlight source according to an ambient light environment, and a light source controller 503 for adjusting a light output of the backlight source 310 according to the determined optimum display method, and the like, may be further added to the micro-shutter display device. By optimizing the transmissive and reflective mode operation, power consumption of backlight can be reduced. Also, sharp picture quality and high visibility suitable for an ambient light environment can be provided to a viewer.

Meanwhile, according to an embodiment of the present invention, the micro-shutter is not limited to the driving by the electrostatic actuation method in the embodiment as described above. Namely, various driving or actuation methods that may cause displacement or deformation of the shutter-micro structure according to a driving electrical signal to open or close the light aperture including the optical conversion unit may also be included in the technical concept of the present invention. Also, electrostrictive or piezoelectric driving, electrothermal driving, electromagnetic driving, driving by a shape memory material, and driving by an electro-active polymer micro-structure, and the like, may be part of the various driving methods that may be applied to the micro-shutter display device according to an embodiment of the present invention.

The invention claimed is:

1. A micro-shutter display device comprising:
a light source configured to emit light;
a lower substrate positioned in a light path of the light source;
an optical conversion unit configured to convert the light from the light source into primary color light corresponding to a sub-pixel and reflecting ambient light having the primary color light corresponding to the sub-pixel, and output the converted light and the reflected ambient light as color light;
a micro-shutter configured to open or close a path of the color light output from the optical conversion unit; and
a driving circuit configured to apply a driving signal to a movable electrode, or to a fixed electrode adjacent to the movable electrode,
wherein the micro-shutter comprises:
a shutter micro-structure connected to the movable electrode, the shutter micro-structure including a shutter blade configured to block the color light output from the optical conversion unit and a shutter aperture configured to allow the color light output from the optical conversion unit to be transmitted therethrough; and
an elastic element connected to the shutter micro-structure, the elastic element configured to provide elastic restoring force when the shutter micro-structure structure is driven.

2. The micro-shutter display device of claim 1, wherein the light source is a backlight unit.

3. The micro-shutter display device of claim 1, wherein the optical conversion unit comprises at least one of:
a light excitation unit made of a phosphor material for converting the light from the light source into the primary color light having a wavelength band corresponding to the sub-pixel;
a dichroic reflective layer reflecting the converted primary color light and allowing light from the light source which has not been converted to be transmitted therethrough; and
a color filter allowing the primary color light corresponding to the sub-pixel to be transmitted therethrough.

4. The micro-shutter display device of claim 3, wherein the optical conversion unit is disposed between a backlight unit and the micro-shutter, and the color filter is disposed between the light excitation unit and the micro-shutter.

5. The micro-shutter display device of claim 3, wherein the light excitation unit is formed as nano-particles including at least one of quantum dots and nanorods.

6. The micro-shutter display device of claim 3, wherein when back light irradiates the primary color light corresponding to the sub-pixel, the light excitation unit is omitted.

7. The micro-shutter display device of claim 3, wherein the dichroic reflective layer is a dichroic filter.

8. The micro-shutter display device of claim 1, wherein the lower substrate comprises:
a transparent substrate;
a light blocking unit formed on one surface of the transparent substrate; and
a transparent passivation layer protecting surfaces of the light blocking unit and the optical conversion unit,
wherein a lower substrate reflective surface is formed between the transparent substrate and the light blocking unit and a lower substrate blackening surface performing a light blocking function is formed between the light blocking unit and the transparent passivation layer.

9. The micro-shutter display device of claim 2, wherein the backlight unit comprises:
a light guide plate element having a reflective layer and configured on a surface facing a junction surface with the lower substrate, wherein the backlight unit is configured to irradiate the light to the light guide plate element.

10. The micro-shutter display device of claim 9, wherein the reflective layer comprises a reflective pattern element having fine prominences and depressions.

11. The micro-shutter display device of claim 1, further comprising:
an ambient light detection sensor; and
a control unit adjusting a quantity of the light output from the light source based on measurement results of the ambient light detection sensor.

12. The micro-shutter display device of claim 1, wherein the lower substrate and the micro-shutter are connected through at least one conductive fixing unit.

13. The micro-shutter display device of claim 1,
wherein when a difference between a potential of the movable electrode and that of the fixed electrode is greater than a pull-in voltage, the shutter micro-structure is opened,
wherein when there is no difference between the potential of the movable electrode and that of the fixed electrode, the shutter micro-structure is closed, and
wherein when the difference between the potential of the movable electrode and that of the fixed electrode is smaller than the pull-in voltage, the shutter micro-structure is partially open at a point where restoring force of the elastic element and electrostatic force are balanced.

14. The micro-shutter display device of claim 1, wherein the driving signal is applied according to any one of an electrostrictive driving method or a piezoelectric driving method, an electrothermal driving method, an electromagnetic driving method, a driving method by a shape memory material, and a driving method by an electro-active polymer micro-structure.

15. The micro-shutter display device of claim 1, wherein a fluid for minimizing a difference between refractive indices of a light output surface of the lower substrate and a light incident surface of an upper substrate is further included in a space between the lower substrate, the micro-shutter, and the upper substrate having the driving circuit.

16. The micro-shutter display device of claim 2, wherein the lower substrate comprises:
a transparent substrate;
a light blocking unit formed on one surface of the transparent substrate; and
a transparent passivation layer protecting surfaces of the light blocking unit and the optical conversion unit,
wherein a lower substrate reflective surface is formed between the transparent substrate and the light blocking unit and a lower substrate blackening surface performing a light blocking function is formed between the light blocking unit and the transparent passivation layer.

17. The micro-shutter display device of claim 2, wherein the lower substrate and the micro-shutter are connected through at least one conductive fixing unit.

* * * * *